(12) United States Patent
Starr et al.

(10) Patent No.: US 8,145,825 B2
(45) Date of Patent: Mar. 27, 2012

(54) GLOBAL SPARE

(75) Inventors: Matthew Thomas Starr, Lafayette, CO (US); Michael Gerard Goberis, Broomfield, CO (US)

(73) Assignee: Spectra Logic Corporation, Boulder, CO (US)

(*) Notice: Subject to any disclaimer, the term of this patent is extended or adjusted under 35 U.S.C. 154(b) by 441 days.

(21) Appl. No.: 12/407,919

(22) Filed: Mar. 20, 2009

(65) Prior Publication Data
US 2010/0241803 A1 Sep. 23, 2010

(51) Int. Cl.
*G06F 12/00* (2006.01)
(52) U.S. Cl. .......................................................... 711/4
(58) Field of Classification Search .................... None
See application file for complete search history.

(56) References Cited

U.S. PATENT DOCUMENTS

| 6,725,394 | B1* | 4/2004 | Bolt ............................. 714/5.11 |
| 7,313,718 | B2 | 12/2007 | Kelman |
| 7,457,846 | B2 | 11/2008 | Baldwin et al. |
| 2008/0301396 | A1* | 12/2008 | Hamada et al. ............... 711/202 |

* cited by examiner

Primary Examiner — Brian Peugh
(74) Attorney, Agent, or Firm — Kenneth Altshuler

(57) ABSTRACT

A storage library is described including a first tape drive that is identified as a target tape drive to a host via a first address and a second tape drive that is masked from being identified by the host. The storage library further includes a controller that is linked with a switch system that shifts the first address to the second drive from the first drive such that after the shift, the second drive is identified as the target drive to the host and the first drive is masked from being identified by the host.

24 Claims, 13 Drawing Sheets

GLOBAL SPARE

CROSS-REFERENCE TO RELATED APPLICATIONS

None.

BACKGROUND OF THE INVENTION

1. Field of the Invention

The present invention relates generally to shifting identity from one storage drive, such as a tape drive, to another storage drive without a host having any knowledge of the shift in identity.

2. Description of Related Art

Tape libraries, which generally house a multitude of tape cartridges, are often equipped with plurality of tape drives which, on occasion, may fail. When failure of a tape drive occurs, the tape library is shut down in order to swap the failed drive with a functional drive. The time over which the tape library is shut down is referred to "downtime". FIG. 1 is used herein to assist in the description of how failed tape drives are replaced with functional tape drives.

FIG. 1 is an illustration of a tape library 100 that is linked with a first host 102 and a second host 104 via first switch system 106 and a second switch system 108. The tape library 100 is illustratively shown with twelve drive bays 110 wherein each drive bay 110 is configured to accommodate a tape drive 112. The tape library 100 possesses eight tape drives 112 and has four empty drive bays 110, each available to receive a tape drive 112. Each tape drive 112 is configured with a Serial Number and a World Wide Name. Hence, as illustratively shown, drive B 114 is linked to switch 1 and switch 2 and possesses a Serial Number (SN) and World Wide Name (WWN), which for purposes of illustration can be SN 1234 and WWN ABCD1234 respectively. If drive B 114 fails, drive B 114 is removed from the associated drive bay 110 and a new similar tape drive is installed with a new Serial Number and World Wide Name, such as SN 5678 and WWN EFGH5678, respectively. The tape library 100 needs to be rebooted in order for the host computers 102 and 104 to recognize that the tape library 100 possesses a new functional tape drive with SN 5678 for and WWN EFGH5678. The acts of replacing drive B 114 and rebooting the library 100 create a lengthy downtime whereby the tape library 100 is unavailable for storage operations.

Some tape library systems have improved the necessity to reboot the tape library by assigning the tape drive Serial Number and World Wide name to the drive bay instead of the tape drive. For purposes of illustration conforming similarly to the aforementioned example, the drive bay 116 can been assigned the SN 1234 and WWN ABCD1234. That way, if a new tape drive is installed as a replacement to a failed tape drive, the new tape drive will be recognized by host computers 102 and 104 as being the tape drive possessing the Serial Number 1234 and World Wide name ABCD1234, thus, eliminating the need to reboot of the tape library 100. Nonetheless, critical time is still lost when the failed tape drive is replaced by a functional tape drive.

In an effort to reduce downtime associated with replacing a failed tape drive with a functional tape drive within a tape library, both methods and apparatuses are disclosed herein. It is to innovations related to this subject matter that the claimed invention is generally directed.

SUMMARY OF THE INVENTION

The present invention generally relates to a storage library that possesses at least one spare drive that is masked from a host and overcomes the disadvantages and limitations of the prior art by shifting identity from one storage drive to the spare storage drive without the host having any knowledge of the shift in identity.

One embodiment of the present invention can therefore comprise a storage library comprising: a first drive identifiable as a target drive to a host via a first address; a second drive; the first drive and the second drive influenced by a switching system that reassigns the first address to identify the second drive as the target drive to the host; and a plurality of removable storage elements adapted to be received by either the first drive or the second drive in a cooperating relationship capable of performing storage operations.

Another embodiment of the present invention can therefore comprise a storage library comprising: a first drive identified as a target drive to a host via at least a first address; a second drive that is masked from being identified by the host when the first drive is the target drive; a controller linked with a switch system that is configured to shift the at least first address to the second drive from the first drive wherein after the shift the second drive is identified as the target drive to the host and the first drive is masked from being identified by the host; and a plurality of removable storage element adapted to cooperate with either the first drive or the second drive to perform storage operations.

Yet another embodiment of the present invention can therefore comprise a method for directing storage traffic in a storage library comprising: indentifying a first drive as a target drive to a host via at least a first address; reassigning the first address to a second drive so that the second drive is identified as the target drive to the host; loading one of a plurality of removable storage elements included in the storage library in a cooperating relationship with the target drive; and receiving storage related communications from the host directed to the target drive.

DETAILED DESCRIPTION

Figure 1A:
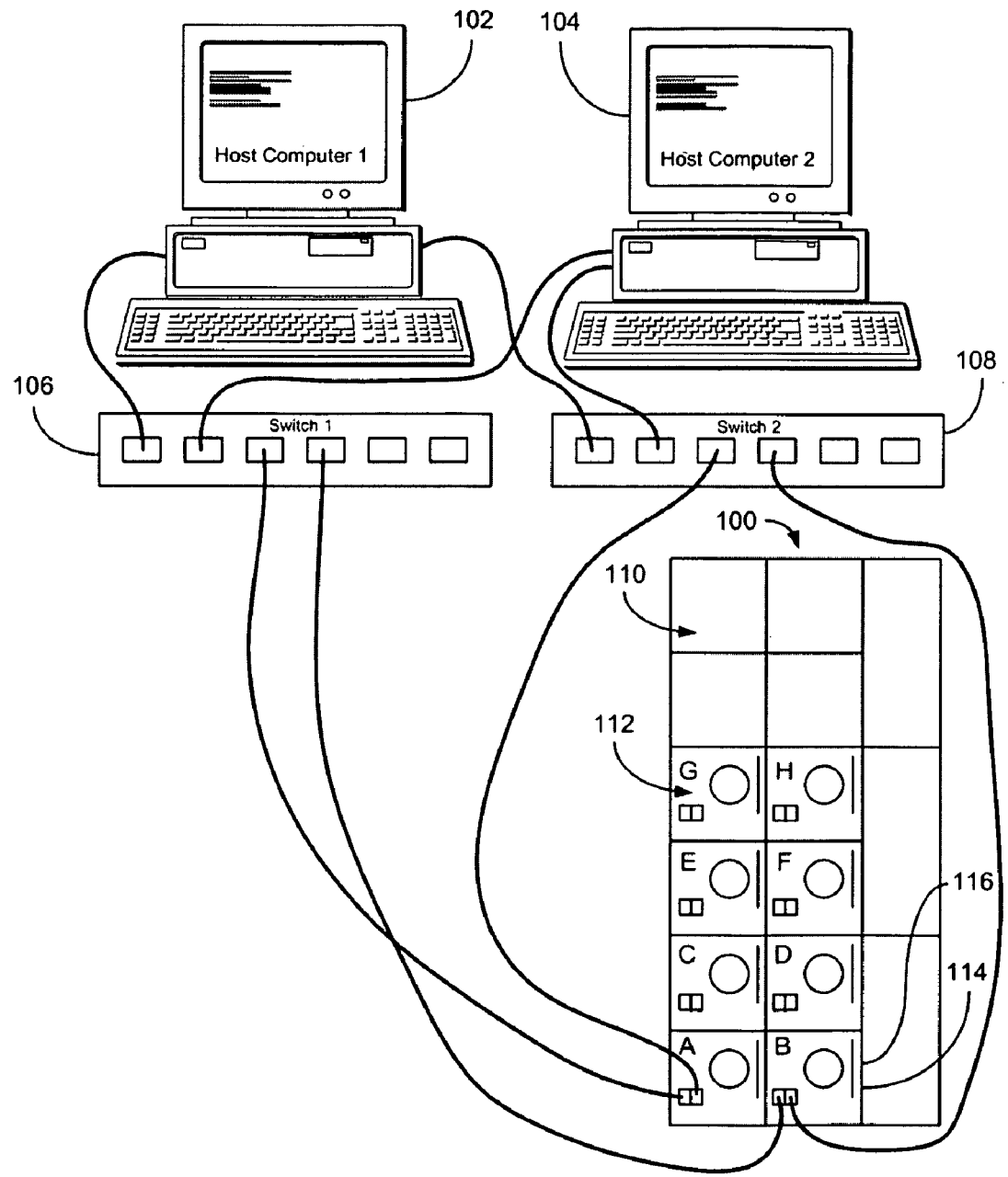
FIG. 1A is a prior art pictorial representation of a tape library that presents tape drives to several host systems.
Figure 2:
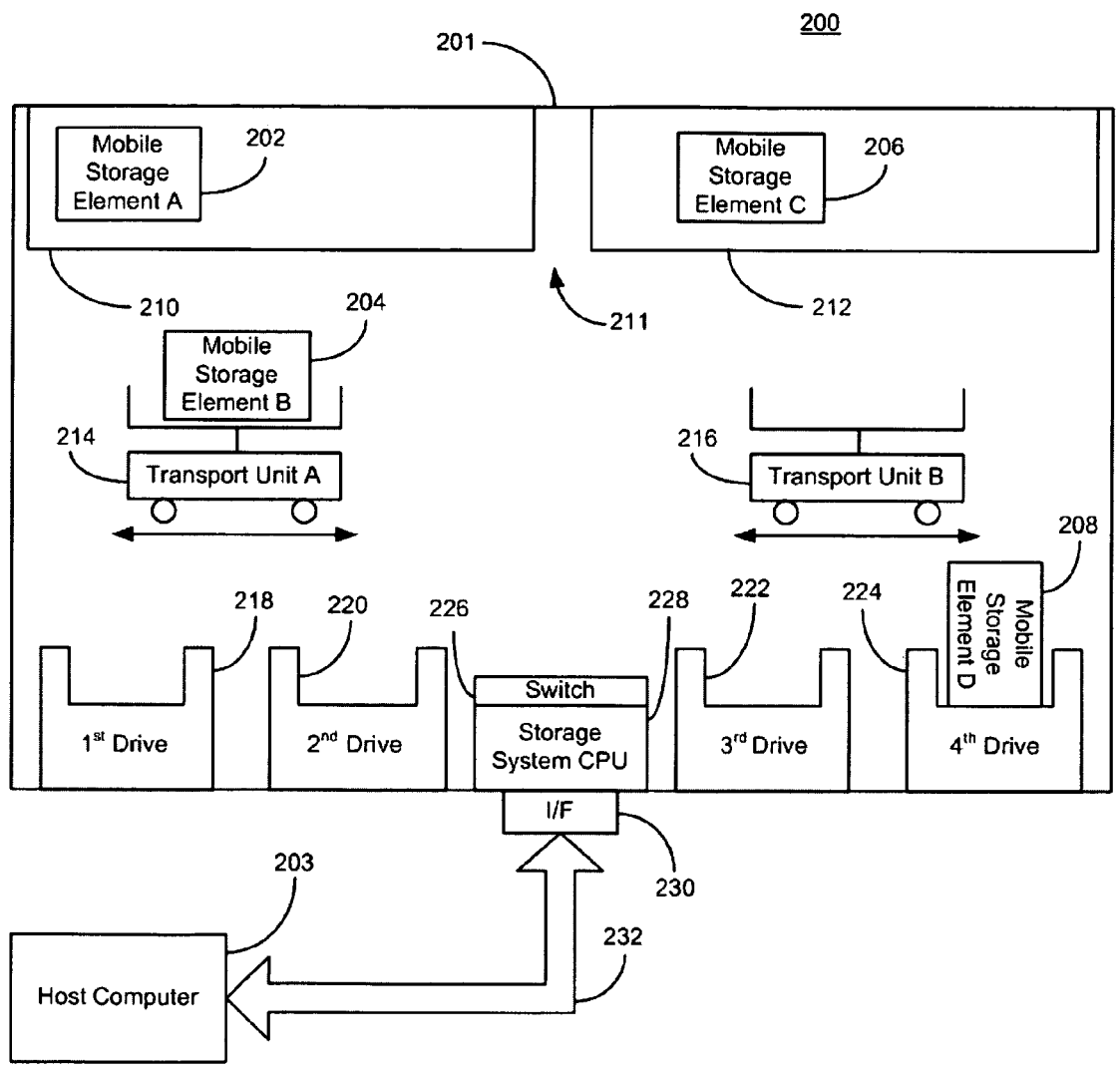
FIG. 2 is a block diagram of a data storage arrangement constructed in accordance with an embodiment of the present invention.

Referring to the drawings in general, and more specifically to FIG. 2, shown therein is a block diagram of a data storage arrangement 200 constructed in accordance with an embodiment of the present invention. In what follows, similar or identical structures may be identified using identical callouts.

The data storage arrangement 200 includes a host computer 203 in communication 232 with a storage system 201 via a primary communication interface processor device (I/F) 230 that includes a host port (not shown). The host computer 203 is one exemplary embodiment of a consumer of data; other embodiments can also include a second storage system, similar to storage system 201, or a streaming output device such as a video server, just to name some examples. A consumer of data is an entity, or entities, that transmits data or receives data for storage elsewhere, i.e., a consumer of data is generally capable of "taking in" and/or "sending out" data. For example, a host computer 203 is a consumer of data when receiving data (or sending data, such as to the storage system 201), and a storage system 201 is a consumer of data when receiving and sending data to another entity wherein the data is stored. The host computer 203 can be a personal computer, a main frame computer, a server, or any computer system capable of communication with the storage system 201, just to name a few examples. The communication path 232 facilitates communication between the host computer 203 and the storage system 201. The means for communication can be accomplished by a dedicated pathway (such as a SCSI [Small Computer Systems Interface] cabled connection) or, in an alternative embodiment, a pathway over a network (such as a LAN, WAN, or other communication architecture), for example. Furthermore, the communication path 232 can be in the form of a wire line pathway, wireless, or a combination thereof, for example.

The storage system 201, which may also considered a data storage library by those skilled in the art, is illustratively shown as generally including a shelf system 211, a first robotic transport unit 214 and a second robotic transport unit 216, four removable storage elements 202, 204, 206 and 208, four drives 218, 220, 222 and 224, a switch system 226, a storage system Central Processing Unit (CPU) 228 and I/F 230. As one skilled in the art will recognize, the block diagram of the storage system 201 shows the primary elements of interest for purposes of simplicity. As such, certain necessary structures and components for the aforementioned elements to properly function are omitted from the detailed description; however, such integrating structures and components do exist within the scope of the present invention. For example, in practice, the storage system 201 includes all of the necessary wiring, user interface panels, plugs, modular components, entry and exit port(s) to introduce (or remove) removable storage elements into the storage system 201, fault protectors, uninterruptable power supplies, processors, busses, robotic transport unit tracks, indication lights, and so on, in order to function as a data storage library.

As shown in the illustrative embodiment, the shelf system 111 possesses a first shelf 210 and a second shelf 212 wherein the first and second shelves 220 and 212 are adapted to support the removable storage elements A 202, B 204, C 206 and D 208. The shelf system 211 can possess a single shelf or multiple shelf levels. The shelf system 211 can be located along one side of the storage system 201, as illustratively shown, or optionally in different locations, such as along opposing walls, for example. Furthermore, the shelf system 211 can provide more tailored accommodating locations adapted specifically to one or more removable storage elements, such as a slot or indentation that matches a removable storage element's footprint. The removable storage element is a storage element that has been adapted for repetitive mobility by a robotic transport unit. The removable storage element can be a disc drive adapted for mobility, a disc drive magazine adapted for mobility, wherein the disc drive magazine comprises a plurality of disc drives, a solid state memory device adapted for mobility, such as a flash memory device, a tape cartridge, a tape magazine comprising a plurality of tape cartridges, an optical disc, a magazine comprising a plurality of optical discs, an independent storage disc, such as a magneto-optical disc or magnetic disc or alternative memory disc used as a storage medium, a magazine comprising a plurality of independent storage discs, or another type of storage device capable of storing data that is adapted for mobility. Further, the removable storage elements are removable from the storage system 201, for example, a tape cartridge, or other mobile storage element, is a removable storage element that can be stored in a location external to the storage system 201 in a vault. Hence, a removable storage element, also called a mobile storage element herein, is a storage element that is intended to be and capable of being moved and engaged with a drive cyclically and frequently. A standard disc drive alone, without modification, for example, is not intended to be frequently moved within or outside of a library (or computer system) and, hence, is not considered removable/mobile in the spirit of the inventive embodiments used herein unless adapted with a feature or features that facilitate mobility, such as high cycle electrical contacts, for example. A drive herein is a device that is adapted to receive and substantially support a removable storage element via an opening in the drive such that when cooperatively linked a read and write relationship is formed (i.e., storage operations are facilitated between the drive and the removable storage medium). Some examples of a drive include, a disc drive docking station, a tape drive, disc drive magazine docking station. A socket adapted to receive a plug, such as a serial port and serial port connector, is not considered to be a docking station, rather, simply a socket.

With continued reference to FIG. 2, the storage system 201 possesses a first robotic transport unit 214 and a second robotic transport unit 216 wherein the first robotic transport unit 214 is illustratively shown transporting magazine B 204 between a drive 218 and the shelf system 212, and a second robotic transport unit 216 that is available for transporting a removable storage element. The term "robot" may be used, herein, to abbreviate the term "robotic transport unit" without departing from the scope and spirit of the present invention. In one embodiment, the robots 214 and 216 are adapted to move between the first shelf 210 and the second shelf 212 and all of the drives 218, 220, 222 and 224. Though the robots 214 and 216 are illustratively shown as block diagrams, one commercial example of a robotic transport unit can be seen in a commercial example of a storage system, namely, a T-950 library manufactured by Spectra Logic Corp., of Boulder, Colo. The T-950 robotic transport units traverse the T-950 library along a track system and move vertically via an elevator system integrated with each robot transport unit. Furthermore, the T-950 robotic transport units possess an integrated picker system that grasps removable storage elements from a shelf system or from a drive to be moved via the associated robotic transport unit. The integrated picker system further is capable of disposing a removable storage element to the shelf system or to a drive. In the illustrative embodiments, the robot merely provides transportation of the removable storage elements from a location associated with the shelf system 211 to a drive wherein the robot may provide the added feature of depositing a removable storage element on the shelf system 212 and/or loading the removable storage element in a cooperating relationship with a drive such that data can be read to and written from the removable storage element via the drive.

In optional configurations, a loading feature can reside with each drive as opposed to a picker unit integrated with a robotic transport unit.

The storage system 201 illustratively shows four drives 218, 220, 222 and 224, however, in optional embodiments, the library may possess more drives or fewer drives. A drive herein is considered to be a device that forms a cooperating relationship with a removable storage element such that data can be written to and from the removable storage element wherein the removable storage element serves as a mass storage device. A drive herein is not merely a socket device and cable, such as that which is used for connecting a disk drive to a computer system. Examples of various drives used within the scope and spirit of this invention include: a tape drive that is adapted to receive tape cartridges, a disk drive docking station which receives a disk drive adapted for mobility that when paired forms a cooperating read and write relationship, such as a disk drive inside an exterior casing with electrical contacts designed for high cycle contacting, and a disk drive magazine docking station which receives a removable disk drive magazine, as exemplified in U.S. Application No. 2006/0132964 to Lau et al, a Compact Disk (CD) drive used with a CD.

In the interest of simplifying the description, the storage system 201 and the components therein will be described in terms of tape library embodiments hereinafter. Hence, a tape library 201 will be used as an embodiment of the storage system 201, tape drives will be used as an embodiment for the drives, and tape cartridges will be used as an embodiment for removable storage elements. The tape library and tape library component embodiments may share common callouts.

With continued reference to FIG. 2, communication protocol is bridged between the host computer 203 and the tape library 201 via the I/F 230. That is, the host computer 203 may communicate over one protocol and the tape library 201 may use a different protocol, hence, the I/F 203 facilitates communication to occur between the tape library 201 and the host computer 203. One commercial example of an I/F system is a Fibre Quad Interface Processor (FQIP) manufactured by Spectra Logic Corporation. The FQIP facilitates communication between a host computer system which uses a fibre protocol and the Spectra Logic storage library which uses a SCSI-like Computer Area Network (CAN) protocol unique to the Spectra Logic Corporation to communicate with the components comprised therein over the library's internal Computer Area Network bus. The I/F 230 is linked to the CPU 228, along with most electrical components within the tape library 201 via a CAN (not shown) specific to the tape library 201. The I/F 230 is illustratively shown in communication via the two way arrow 232 with the host computer 203. Generally, the host computer 203 issues a read element status request used to determine the identity and volume of tape cartridges, the number of tape drives and their respective logical unit numbers, the number of robots, tape cartridges going in and out of the library 201. More specifically, the library 201 maintains element addresses which include storage element addresses, data transfer element addresses, import/export element addresses, and media transport element addresses.

Figure 3A:
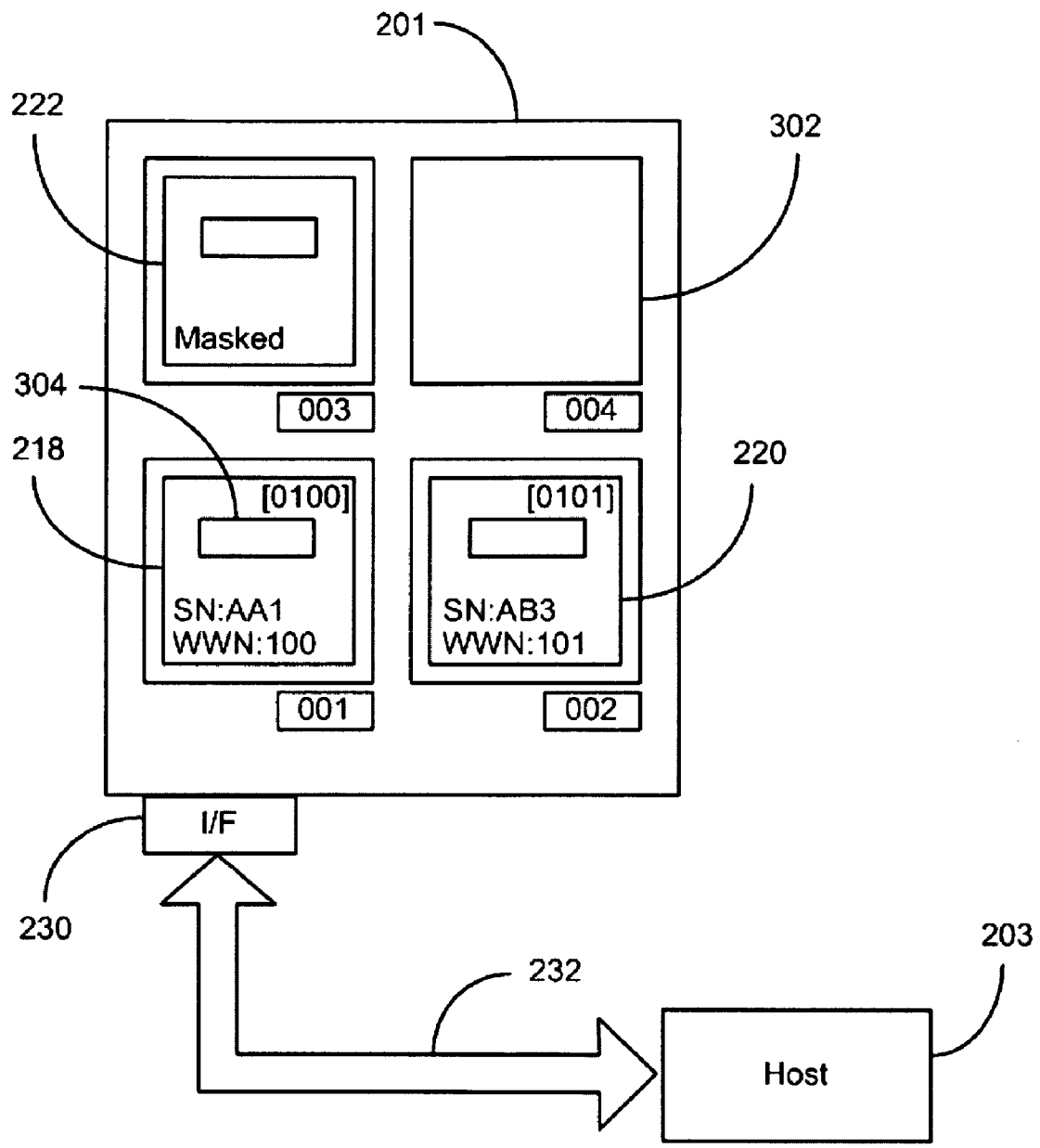
FIGS. 3A and 3B are block drawings of certain specific elements from FIG. 2 used to illustrate an embodiment of the present invention.

FIG. 3A is a block drawing of specific elements from FIG. 2 used herein to illustrate an embodiment of the present invention. As shown, the library 201 has a first tape drive 218 that possesses an element address of [0100], Serial Number (SN): AA1 and World Wide Name (WWN): 100, and that resides in drive bay [001]. The first tape drive 218 has an opening 304 adapted to receive a tape cartridge (not shown) in order to perform storage operations. Storage operations include reading and writing data to and from the tape cartridge, as well as indexing across the tape or performing other operations when the tape cartridge is in a cooperating relationship with the drive 218. The drive bays (generically element 302) are locations in the library 201 that hold and support a drive 218, for example. A drive bay 302 is adapted to receive a drive 218 (or a drive sled that contains a drive, as discussed later) and interconnect with the drive 218 such that, when the drive 218 is installed in a drive bay 302 (forming a cooperating relationship), connectivity, such as power and communication, are provided to the drive 218. Drives can be exchanged or moved from one drive bay 302 to another. Drive bay [004] does not possess a drive and is available to receive a fourth drive, for example. The library 201 further comprises a second drive 220 that possesses an element address of [0101], SN: AB3 and WWN: 101, and resides in drive bay [002] and a third drive 222 that is masked from being viewed by the host 203.

The element addresses [0100] and [0101] are viewable by the host 203 via a number designation that is internally known by the library 201. For example, the library 201 is illustratively shown having three drives 218, 220 and 222 wherein only the first drive 218 and the second drive 220 are revealed to the host 203 via the element address [0100] and element address [0101], respectively. In some instances, the host 203 may rename or renumber the element addresses in a designation that is better suited for the host 203, such as 1, 2, 3, etc., however, in the interests of simplicity, the element addresses will be described as illustratively shown.

The drives can be connected to the host 203 separately and additionally from the connection that makes the drives internally known by the library 201 through element addresses, in what is known to those skilled in the art as a direct connect drive. The direct connect drive can be viewed by the host 203 via the drive's Serial Number (SN) and World Wide Name (WWN) over the host interface bus through the I/F 230. Optionally, a drive can be connected to an intermediate interface device, such as a Spectra Logic FQIP. Any modification of the drive or drive's status can occur in the library's background and be masked from the host 201, as shown by a third drive 222.

A Read-Element-Status (loosely called an inventory) command is part of the inventory request made by the host 203 wherein the host 203 identifies all elements having element addresses within the library 201. The host 203 further identifies the tape drives possessing a WWN and SN maintained by the library 201 as seen over the host interface bus 230 and 232. The host 203 draws correspondence between certain tape drive element addresses and WWNs and SNs, such as element address [0100], WWN: 100 and SN: AA1 which all correspond to the first drive 218, for example. Hence, in practicality, the host 203 identifies additional data transfer devices, i.e. tape drives, via the interface 230 (i.e. fibre or SCSI). The host 203 maps element address [0100] to WWN and SN of the drive. When the bus is over fibre channel, it is a fibre address, and on SCSI, it is a SCSI address, for example. There is a one to one correspondence between the drives found by the host 203 and those drives that have element addresses maintained, or inventoried, by the library 201.

The masked drive 222 in drive bay 003 is a spare drive that is masked from the host 203 in what herein is referred to as a "global spare" drive. The global spare drive 222 is hidden in the library 201 in that it does not have an assigned data transfer element address. The global spare 222 is further disabled from being identified over the host interface bus 230 and 232, i.e. the global spare 222 is turned off, in hibernation, in some other inactive stasis, or otherwise in an "off-line" state. The library 201 can display that there is a drive 222 present in drive bay [003] through a graphical user interface (not shown) located on an exterior panel associated with the library 201. Optionally, the global spare 222 may be seen externally as an element within drive bay 222, for example, by the manufacturer or library owner via a pathway that is different from the host 203. In an optional embodiment, the global spare drive 222 possesses a data transfer element address that is masked from the host 203 but is viewable by other privileged users.

Figure 3B:
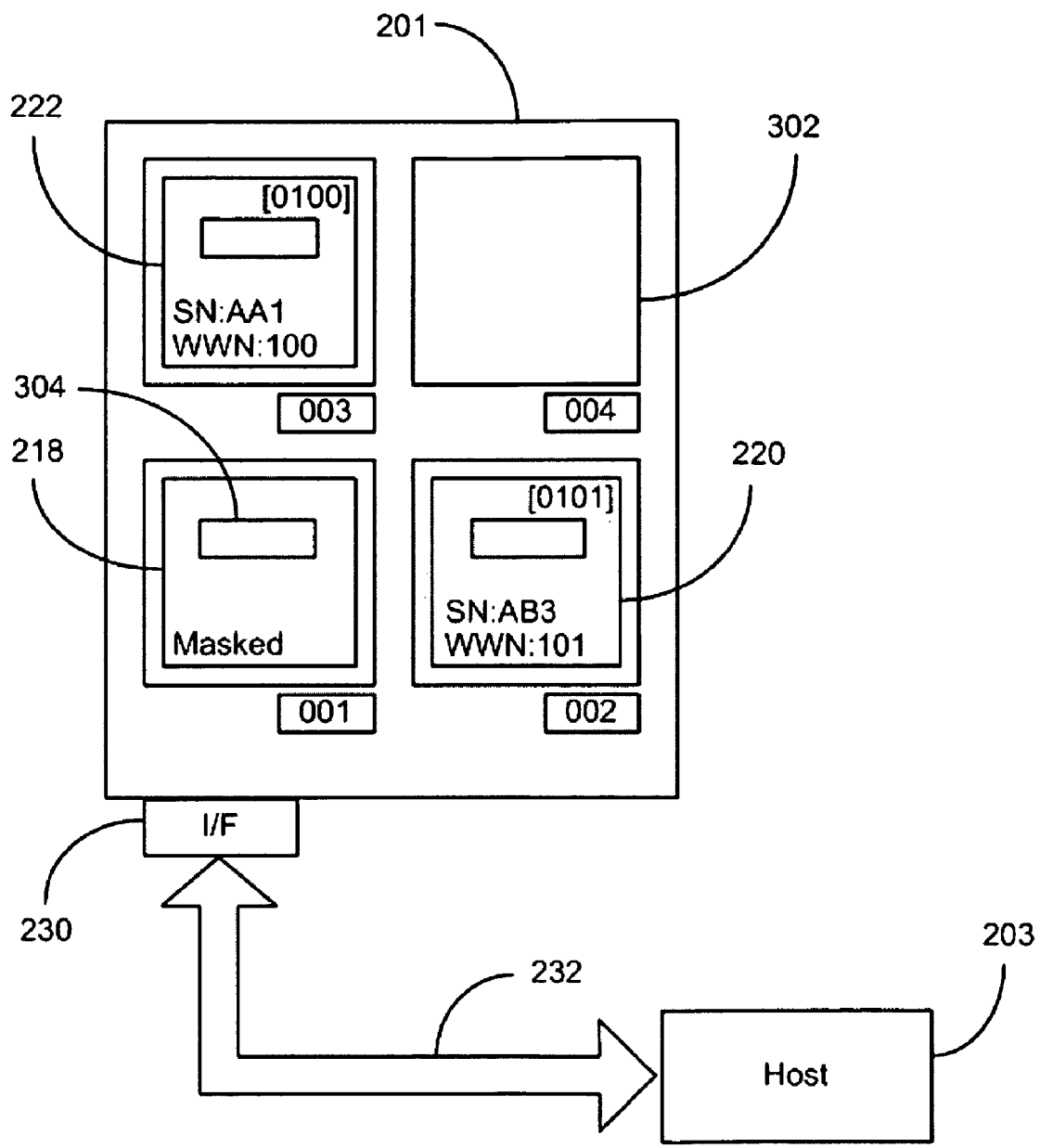

In the present embodiment, the first drive 218 can be disabled and the identity of the first drive 218 can be shifted to the global spare drive 222 (not necessarily in that order) as illustratively shown in FIG. 3B. Hence, the first drive 218 is no longer identified by the host 203. As shown, the identity of the first drive 218, originally associated with element address [0100], SN: AA1 and WWN: 100, is now assumed by the global spare drive 222 residing in drive bay [003]. Because the host 203 has no knowledge that the original drive has been taken "off-line" and replaced with a new drive, the library 201 can remain operational, in contrast to being rebooted and reconfigured to map out a new drive as is done historically. This shift in identity from the first drive 218 to the global spare drive 222 can be accomplished by remapping the library 201 via a processor or controller (known to those skilled in the art) capable of shifting identity of the drives, such as by Spectra Logic's FQIP, for example. In one commercial embodiment, shifting from the first drive 218 to the global spare drive 222 is accomplished by a single executable command initiated by touching a dedicated icon displayed on a touch screen that is located externally on an E-950 tape library, produced by Spectra Logic Corp., for example. Optionally, changing identity from the first drive 218 to the global spare drive 222 can be accomplished automatically, such as if the library 201 senses that first drive 218 is malfunctioning for example. In a different embodiment, an authorized person from a remote location can initiate the sequence for changing identity from the first drive 218 to the global spare drive 222, for example. Thus, the global spare drive 222 assumes the identity of a malfunctioning or disabled drive insofar as the host 203 is concerned.

In one embodiment of the present invention, the first drive 218 can be removed from the library 201 after the first drive's identity has shifted to the global spare drive 222 without shutting down the library 201. A new drive can then be installed in drive bay [001], and, thereafter, the identity of the global spare drive 222 can be shifted back to the new drive in drive bay [001]. Once again, rendering the global spare drive 222 masked and "off-line".

Figure 4A:
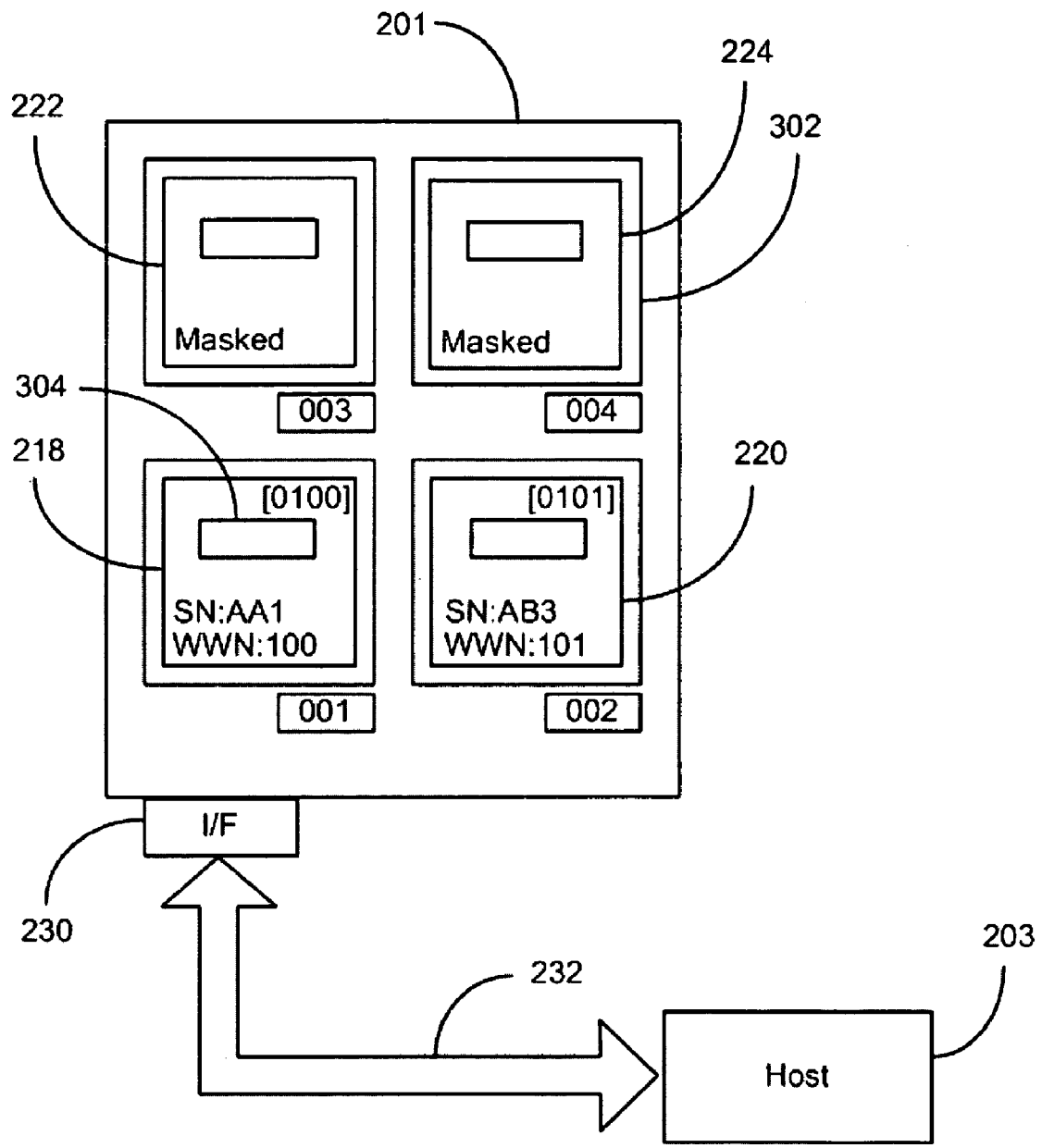
FIG. 4A-4D are block diagrams illustrating various embodiments of multiple global spare configurations consistent with embodiments of the present invention.

FIG. 4A is a block diagram illustrating an embodiment of multiple global spare drives consistent with embodiments of the present invention. As illustratively shown, the library 201 of FIG. 3A further possesses a second global spare drive 224 disposed in drive bay [004] 302. The second global spare drive 224 is masked from being identified by the host 203 and can be used prior to the other global spare drive 222. Choosing which global spare drive 222 or 224 will assume the identity of either the first drive 218 or the second drive 220 can automatically predetermined or selectively determined by the user or library operator. A display on the graphical user interface (not shown) can illustrate the global spare drive options and can be chosen by a single touch on the graphical user interface touch screen. Furthermore, as will be discussed in more detail, the global spare drives 222 and 224 can belong to separate partitions, no partitions, the same partition, etc., without departing from the scope and spirit of the present invention.

Figure 4B:
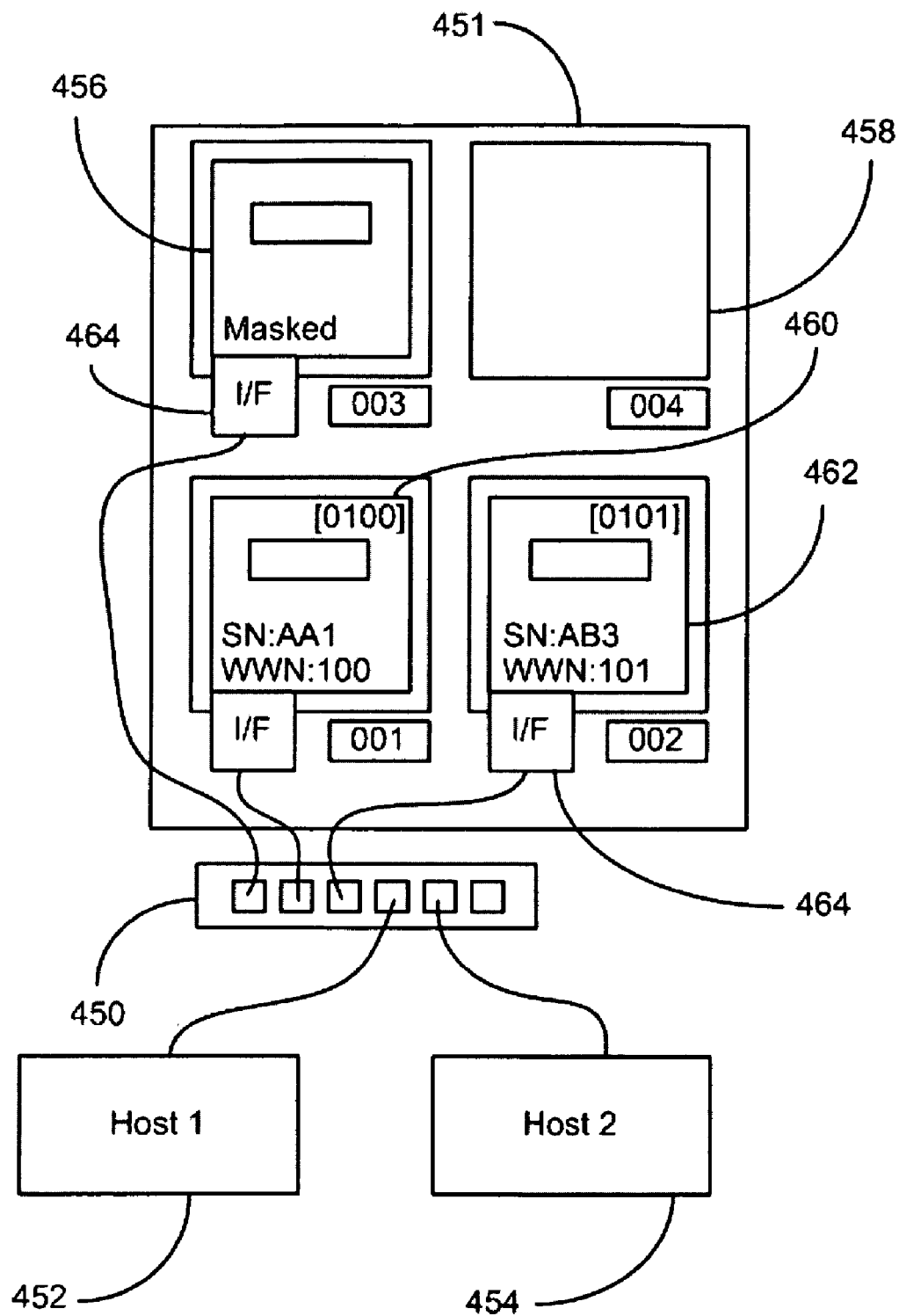

FIG. 4B is a block diagram illustrating an embodiment of multiple host computers 452 and 454 linked to drives via an external switch system 450. As illustratively shown, the tape library 451 comprises a global spare drive 456, a vacant drive bay 458, a first tape drive 460 that possesses an element address of [0100], Serial Number (SN): AA1 and World Wide Name (WWN): 100, and resides in drive bay [001]. The library 451 further comprises a second drive 462 that possesses an element address of [0101], SN: AB3 and WWN: 101, and resides in drive bay [002] and a third drive 456, functioning as a global spare drive, that is masked from being viewed by the hosts 452 and 454. All of the drives 456, 460 and 462 possess an interface 464 that are connected to the switch system 450 directly. Only the first and second drives 460 and 462 are viewable to the hosts 452 and 454. In one embodiment of the present invention, the first drive 460 is allocated to the first host 452 wherein the first drive 460 is in a first partition. The second drive 462 is allocated to the second host 454 wherein the second drive is in a second partition. The global spare drive 456 can be allocated to either partition in the event that one of the first or second drives, 460 or 462, are taken "off-line" and their respective identity switched to the global spare 456. In this illustration, the drives are not redundantly linked to the hosts 452 and 454 should one of the connection lines fail.

In the present embodiment, the first drive 460 can be disabled, and the identity of the first drive 460 can be shifted to the global spare drive 456 (not necessarily in that order) via the switch system 450. Once the identity has been switched, the first drive 460 is no longer identified by either of the hosts 452 or 454 as a data transfer element. This shift in identity from the first drive 460 to the global spare drive 456 can be accomplished by the switch system and remapped by a controller (not shown) linked to both the library 451 and the switch system 450. The controller (not shown) can reside in either the library 451 or the switch system 450, in optional embodiments. In optional embodiments, the switch system 450 can reside either in the library 451 or external to the library 451.

Figure 4C:
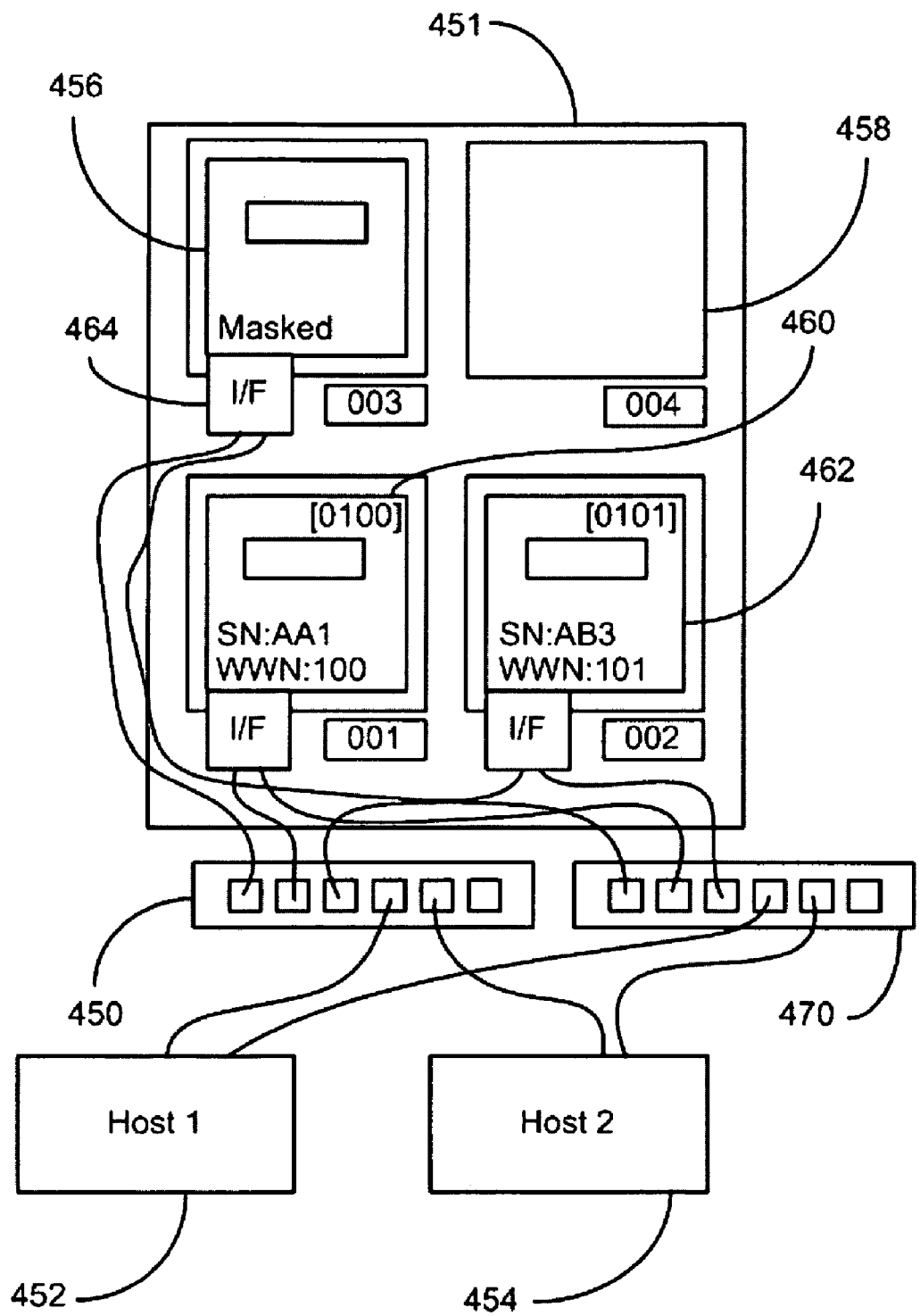

FIG. 4C shows an optional embodiment, similar to that shown in FIG. 4B, the drives 456, 460 and 462 are linked to the hosts 452 and 454 redundantly. As illustratively shown, there are two switch systems 450 and 470 that are each linked to all of the drives 456, 460 and 462 and both hosts 452 and 454. Consequently, one of the switch systems 450 or 470 can fail and connectivity remains intact.

Figure 4D:
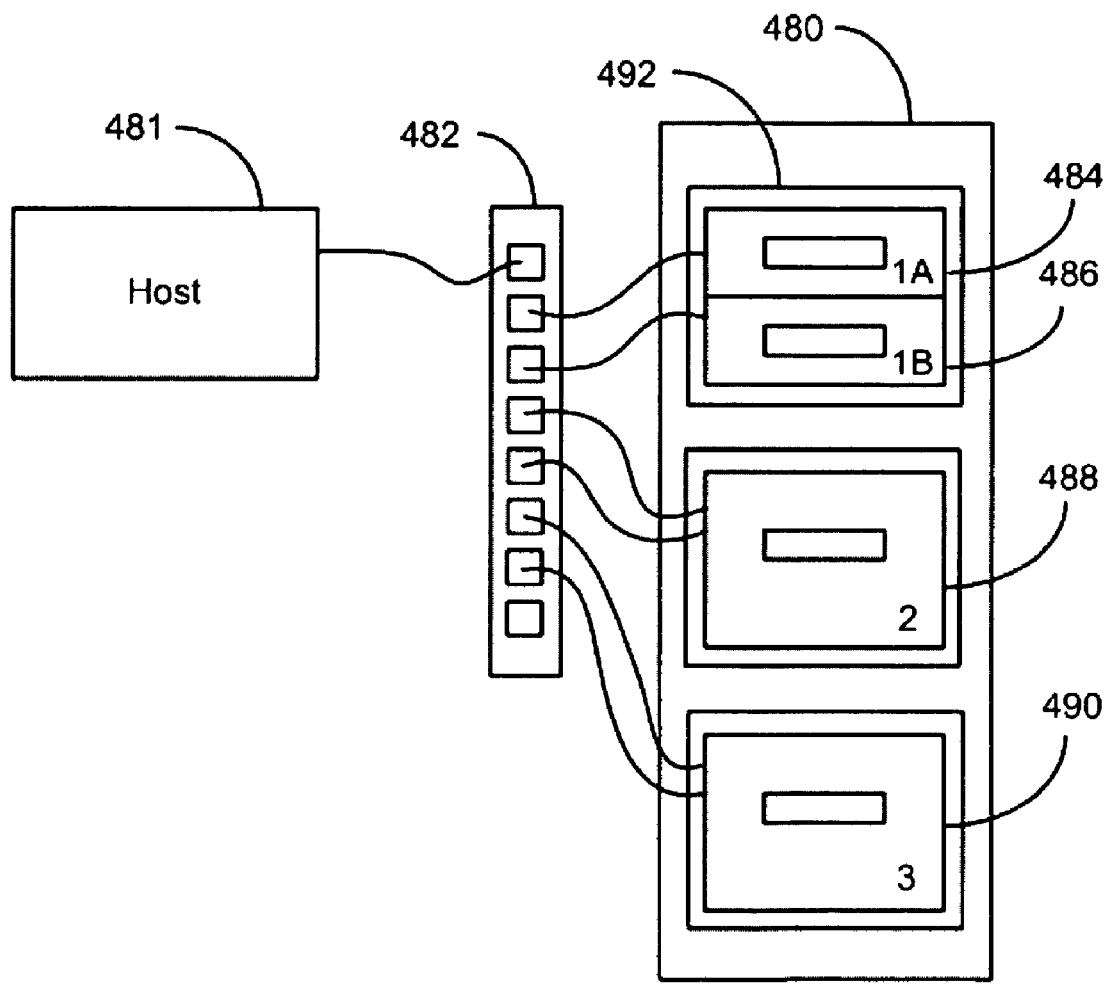

FIG. 4D shows yet another embodiment of the present invention wherein a global spare can be a dedicated half height drive. As illustratively shown, a host 481 is linked to drives 1A 484, 1B 486, 1C 488 and 1D 490 via the switch system 482. Drives 1A 484 and 1B 486 are half height drives that can reside in a single drive bay 492. In this embodiment, drive-1B 486 can be designated as a global spare, thus, the rendering drive-1B 486 masked from the host 481. The host, therefore, sees only drive-1 (or 1A 484), drive-2 488 and drive-3 490. In the event drive-1A 484 is taken "off-line", drive-1B 486 can be brought "on-line" and the host 481 will have no knowledge of the identity shift. The host 481 only sees drive-1 (now 1B 486), drive-2 488 and drive 3 490. Optionally, drive 2 488 could be taken "off-line" and the identity associated with drive 2 488 can be transferred to the global spare 486, thus, making the global spare 486 appear to the host 481 as drive 2 488.

Figure 5A:
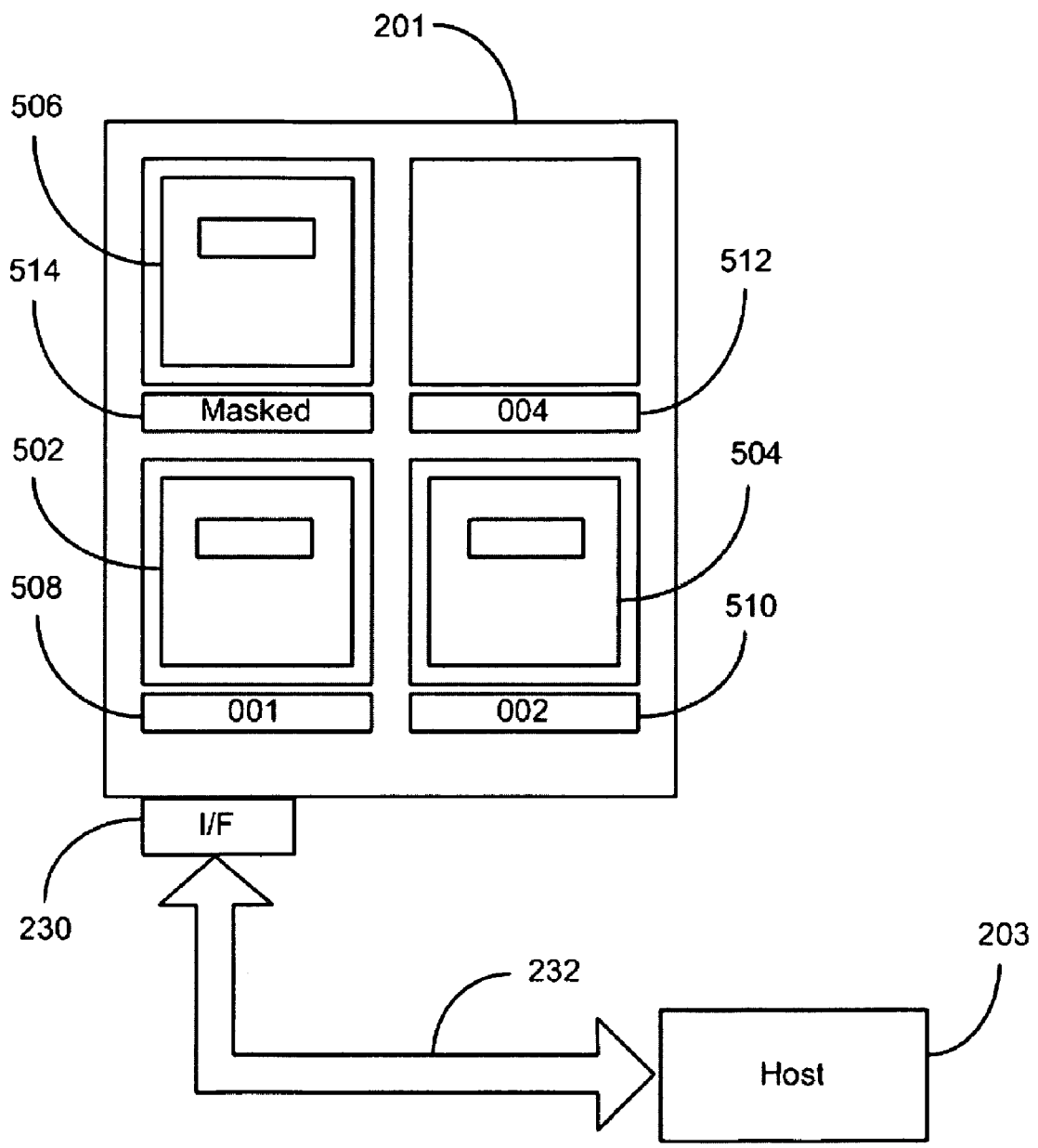
FIG. 5A is a block diagram illustrating an embodiment of identifying drives via drive bay addresses consistent with embodiments of the present invention.

FIG. 5A is a block diagram illustrating an embodiment of identifying drives via drive bay addresses consistent with embodiments of the present invention. As illustratively shown, the library 201 possesses a first drive 502 that is disposed in drive bay [001] 508, a second drive 504 disposed in drive bay [002] 510, a global spare drive 506 that is masked 514 from being viewed, or identified, by the host 203 and an empty drive bay [004] 512. In the present embodiment, the host 203 identifies (i.e. maps) drives via an address associated with each drive bay. Hence, the first drive 502 is identified as the first drive via the address associated with drive bay [001] 508 in what can be used as a storage element address. Hence, the storage element addresses can be arranged to correspond to drive bays that possess a drive. The global spare drive 506 is masked from being identified by the host 203. In other words, the host 203 has no knowledge of the global spare 506 because there is no address that the host 203 can see to indicate the presence of a drive.

Figure 5B:
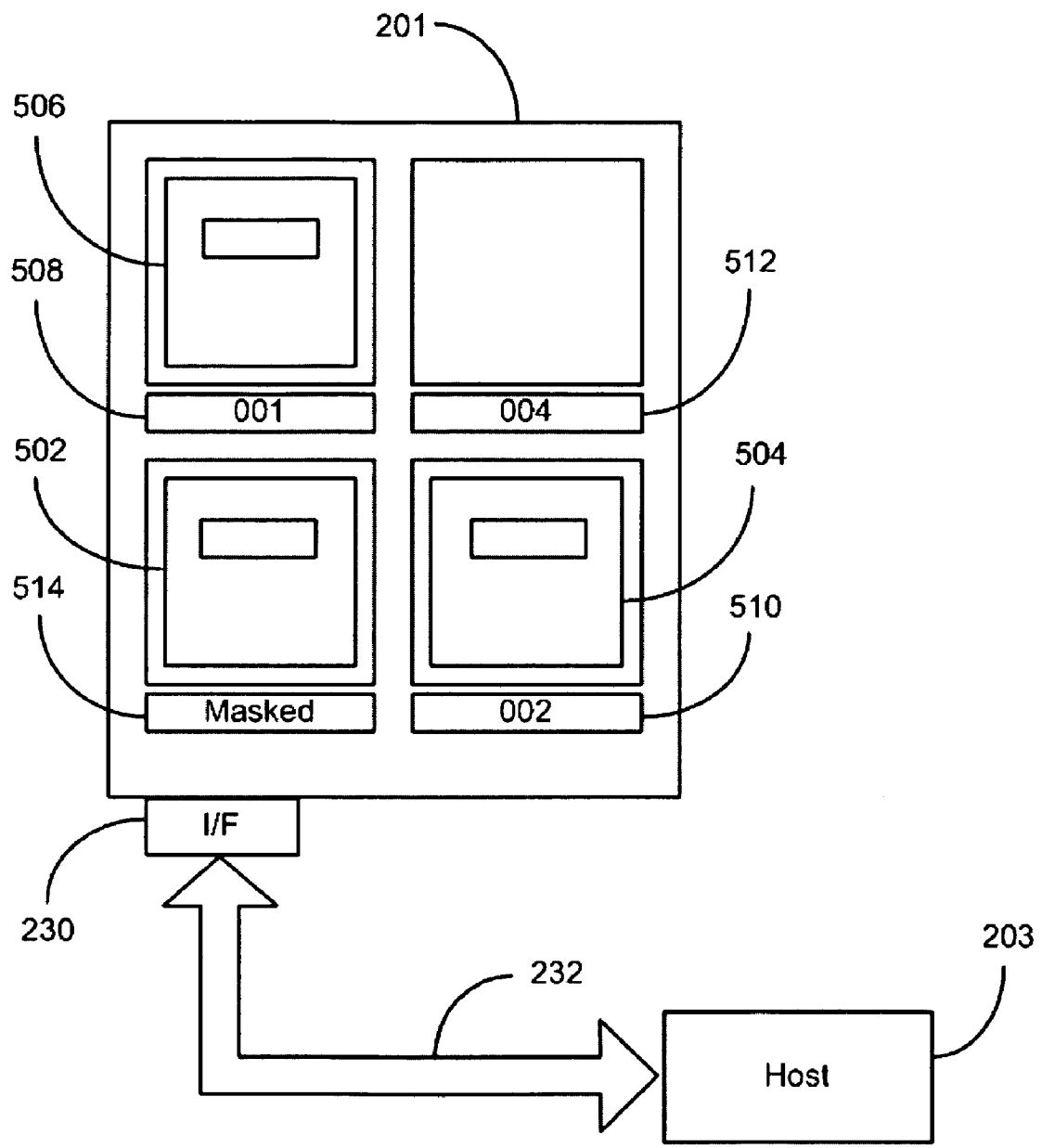
FIG. 5B is a block diagram illustrating an embodiment of switching drive identity via drive bay addresses consistent with embodiments of the present invention.

FIG. 5B is a block diagram illustrating an embodiment of switching drive identity via drive bay addresses consistent with embodiments of the present invention. As illustratively shown, the drive bay address 514 associated with the first drive 502 is masked from view to the host 203 and drive bay address [001] 508 is reassigned to the global spare 506. In one embodiment, this can be accomplished by a switch system 226, of FIG. 2, and controller, such as the I/F 230 of FIG. 2, associated with the library 201 and can be executed by touching visual prompts on a graphical user interface touch screen (not shown) associated with the library 201.

Figure 6:
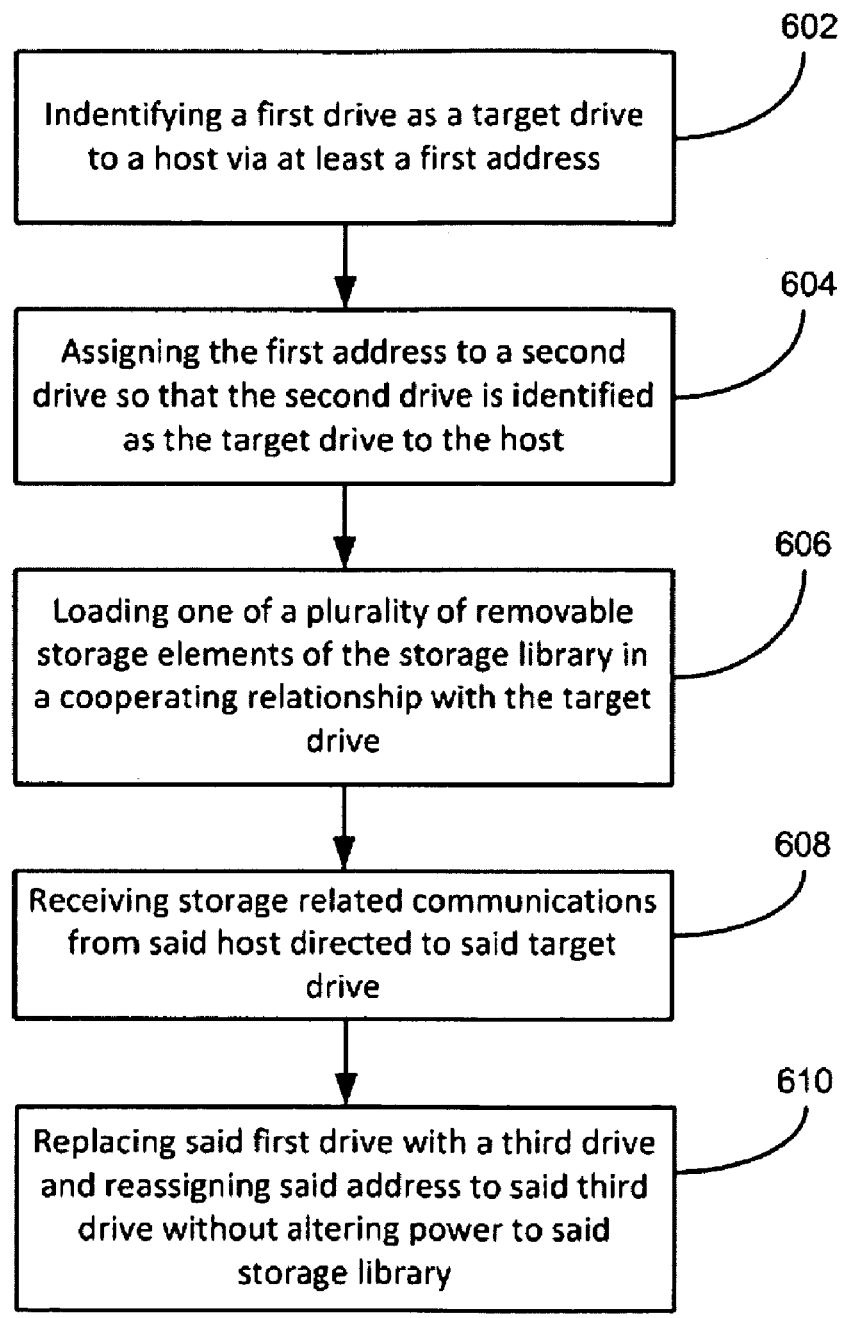
FIG. 6 is a block diagram illustrating a method to practice an embodiment of the present invention.

Referring now to FIG. 6, shown therein is a block diagram illustrating method steps to practice an embodiment of the present invention. It should be recognized that the steps presented in the described embodiments of the present invention do not necessarily require any particular sequence unless otherwise specified explicitly or by alphabetizing or numbering steps. FIGS. 3A and 3B are used in conjunction with FIG. 6 for purposes of illustration in the present described embodiment. The steps describe an embodiment consistent with the present invention of a method for directing storage traffic in a storage library 201 as shown in FIGS. 3A and 3B. Step 602 is a step for identifying the first drive 218 as a target drive to the host 203 via the drive element address [0100], SN: AA1 and WWN: 100. In an optional embodiment, the first drive 218 can be identifiable by a single address, such as the drive bay address [001], for example. In the present embodiment, the global spare 222 is masked from being identified by the host 203. In other words, the host 203 has no knowledge of the existence of the global spare 222. Step 604 is a step for reassigning the drive element address [0100], SN: AA1 and WWN: 100 to the global spare 222 so that the global spare 222 is identified as the target drive to the host 203. The first drive 218 can then be masked from being identified by the host 203. The identity associated with element address [0100], SN: AA1 and WWN: 100 can, in one embodiment, be shifted simultaneously from the first drive 218 to the global spare 222. In another embodiment, the identity associated with element address [0100], SN: AA1 and WWN: 100 can be removed from the first drive 218 and then some time later be shifted to the global spare 222, just to name several sequencing examples. Step 606 is a step for loading one of a plurality of removable storage elements included in the storage library 201 in a cooperating relationship with the target drive possessing the element address [0100], SN: AA1 and WWN: 100. Loading a storage element, such as a tape cartridge, for example, can be done with the first drive 218 prior to shifting identity as the target drive or to global spare 222 after the identity as the target drive is shifted to the global spare 222. Likewise, in step 608, receiving storage related communications from the host 203 can then be directed to the target drive possessing the element address [0100], SN: AA1 and WWN: 100. Performing storage related operations, such as indicating to the host 203 that the target drive is loaded successfully with a tape cartridge and is ready and waiting for the next instructions (i.e., when reading and writing data), can be done with the first drive 218 prior to shifting identity as the target drive or to global spare 222 and after the identity as the target drive has been shifted to the global spare 222. Step 610 is a step for replacing the first drive 218 with a third drive (not shown) and reassigning the target drive element address [0100], SN: AA1 and WWN: 100 to the third drive without altering power to the storage library 201. This may be done if the first drive 218 is taken "off-line" for maintenance or any other reason, for example. The third drive can be replaced in the drive bay [001], where the first drive 218 resided prior to removal from the library 201, and the global spare 222 returned to a masked status as a spare drive should another drive in the library 201 need to be taken "off-line". The aforementioned method can be performed with any number of different drives, such as the second drive 220, known to the host 203 as a potential target drive.

Figure 7A:
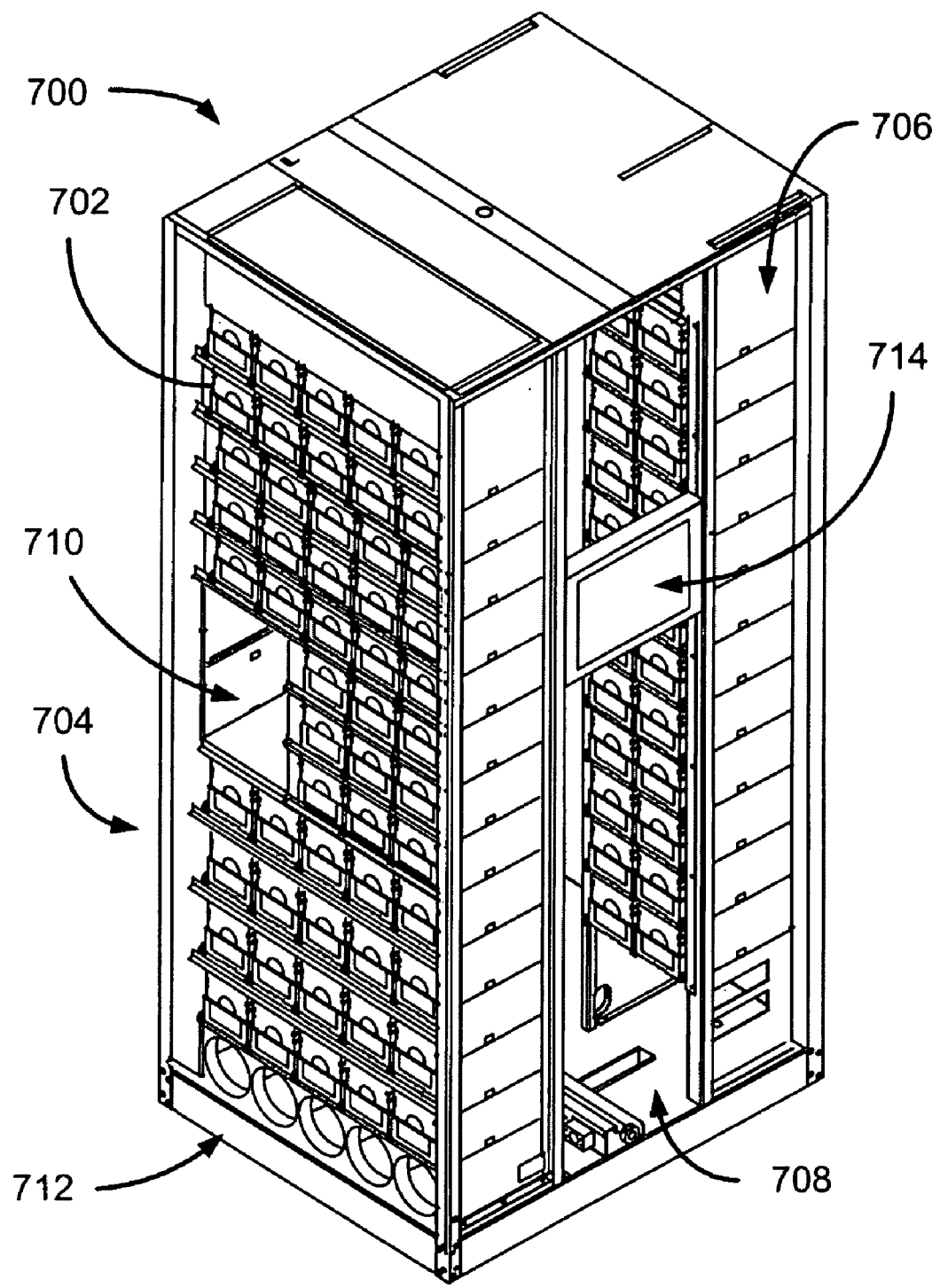
FIGS. 7A and 7B show different perspective views of a Spectra Logic e-950 storage library without a cover in which some embodiments of the present invention can be commercially practiced.
Figure 7B:
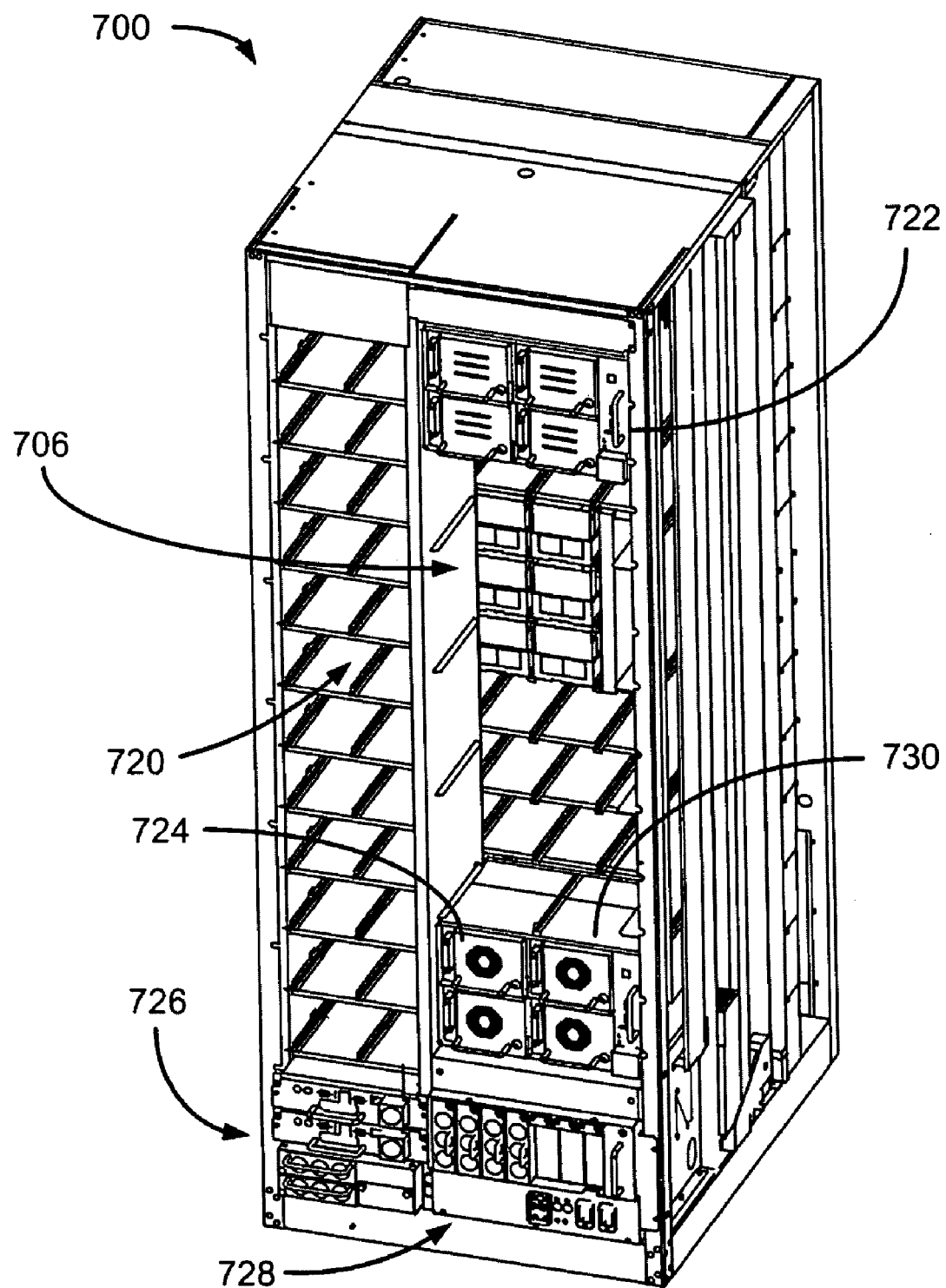

Embodiments of the present invention can be practiced in conjunction with an e-950 series data storage library 700 produced by Spectra Logic Corporation as shown in FIGS. 7A and 7B. The e-950 series library 700 is capable of comprising both disc drive magazines and tape cartridges. FIG. 7A shows a front view of the library 700 populated with tape cartridges which are disposed in tape cartridge magazines 702. A tape cartridge and a disc drive magazine are both embodiments of a removable storage element. In one embodiment, the e-950 library 700 comprises a shelf system 704 that is adapted to support the tape cartridge magazines 702 and the disc drive magazines (not shown) which are archived in the library 700. In one configuration, the footprint of a tape cartridge magazine 702 and a disc drive magazine are substantially identical for compatibility when archiving in the shelf system 704 or for moving the magazines 702 within the library 700 via a common robotic system. The e-950 library 700 further comprises a user definable space 706 capable of comprising additional shelf space 704 for storage elements 702 and/or space dedicated for drives, such as an LTO-3, tape drive(s) and/or disc drive magazine docking station(s) (not shown) adapted to receive disc drive magazines to form a connection link with the library 700. Functionally interposed between the user definable space 706 and the shelf system 704 is a magazine transport space 708. The magazine transport space 708 is adapted to provide adequate space for a magazine 702 to be moved from a position in the shelf system 704, for example, to a drive, such as an LTO-3 tape drive. Magazines 702 can be transferred into and out from the e-950 library 700 via an entry/exit port 710. Transferring magazines 704 in an out of the e-950 library 700 can be accomplished by an operator, for example. The e-950 library 700 comprises a means for cooling as shown by the fans 712 located at the base of the library 700. The e-950 library 700 further comprises a Graphical User Interface, GUI, which is implemented with a touch screen 714.

With reference to FIG. 7B, shown therein is the e-950 library 700 without an enclosure, rotated 180° relative to FIG. 7A exposing the user definable space 706. The user definable space 706 shows a column of additional shelves 720 for archiving magazines 702, a block of four disc drive magazine docking stations 722, a block of four LTO-3 tape drives 724, and additional vacant user definable space 706. The e-950 library 700 also comprises a Library Control Module, LCM, 726, the Spectra Logic's FQIP 726, and a power supply 728 capable of converting AC current to DC current for consumption by the library 700.

The e-950 library 700 is capable of bridging communication between at least two different communications protocols on either side of the FQIP 726. The FQIP 726 functions as a combination bridge controller device enabling communication between the e-950 library 700 and a client, or host, in a fibre channel protocol, for example, and communication from the FQIP 726 to a drive 724 via the Computer Area network in a SCSI channel protocol. Furthermore, the FQIP 726 is adapted to direct data for storage on a specific drive possessing a storage element address, SN and WWN. Directing data traffic via the FQIP is necessary for mapping out any global spare drives or facilitating library partitions. The e-950 library 700 is capable of being divided into partitions such that a first client, or host, may be allocated a first partition, or fraction, of the library's 700 storage capacity and resources (for example 60 percent of the storage space within the library 700) and a second client, or host, is allocated the remainder of the library's 700 storage capacity and resources (for example 40 percent of the storage space within the library 700) in a second partition. It should be recognized that the number of partitions can exceed two. One embodiment of the present invention contemplates the global spare 730 as independent to a specific partition until the global spare 730 is used in a specific partition. At that time, the global spare 730 assumes the SCSI Element Address of the drive 724 replaced in that partition. Once undone, the global spare 730 can be used by another partition again. Other embodiments contemplate the use of multiple global spares that can each be assigned to a specific partition. Optionally, one global spare can be assigned to a specific partition and another available for all partitions.

With continued reference to e-950 library 700 in relation to the global spare 730, the LCM 726 functions to, among other things, provide a local interface, such as the GUI touch screen 714, or a remote interface, such as a Personal Computer, PC, (not shown) accessible through a web browser, for example. The library 700 further possesses a plurality of drive bays that each accommodates a drive sled, generally comprised by the components shown in the tape drives 724. A drive sled is a structure that contains a tape drive 724 and provides connectivity between the tape drive 724 and the drive bay. The drive sled contains a Drive Control Module, DCM, which is linked to the LCM 726 via the CAN. When a drive 724 is taken "off-line" and a global spare drive 730 is brought "on-line", such as by way of the GUI 714, the DCM 726 is reconfigured, i.e., instructed, to assume the SN and WWN information of the drive 724 that was taken "off-line" and the LCM 726 remaps the global spare location (generally 730) to assume the same element address as the drive 724 that was taken "off-line". The new map, or library configuration, is stored in a flash element comprised by the LCM 726. Hence, the global spare 730 assumes the identity of the original drive 724 that was taken "off-line" without the client, or host, having any knowledge of the identity switch. In this way, a drive that becomes "downed" due to a drive failure, such as drive 724, is taken "off-line" and the "downed" drive's identity is shifted to the global spare 730. The global spare 730 is "upped" (or taken "on-line") such that the client, or host, has no knowledge that a shift in identity has occurred, thus, saving the library 700 from being shut down and reconfigured by the host.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, multiple drives can be used as global spares, for example, while still maintaining substantially the same functionality without departing from the scope and spirit of the present invention. Another example can include using these techniques across multiple library partitions, to name a few examples while still maintaining substantially the same functionality without departing from the scope and spirit of the present invention. Further, though communication is described herein as between a client and the library, such as the library 201, communication can be received directly by a drive, such as the first drive 218, via the interface device 230, for example, without departing from the scope and spirit of the present invention. Further, for purposes of illustration, a first and second drive and tape cartridges are used herein to simplify the description for a plurality of drives and tape cartridges. Finally, although the preferred embodiments described herein are directed to disc drive systems, such as the tape cartridges and tape storage systems, such as a tape library and tape drives, and related technology, it will be appreciated by those skilled in the art that the teachings of the present invention can be applied to other systems, without departing from the spirit and scope of the present invention.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. A storage library comprising:
   a first drive identifiable as a target drive to a host via a first address;
   a second drive;
   the first drive and the second drive influenced by a switching system that reassigns the first address to identify the second drive as the target drive to the host;
   a plurality of removable storage elements adapted to be received by either the first drive or the second drive in a cooperating relationship capable of performing storage operations;
   a first drive bay that accommodates the first drive and a second drive bay that accommodates the second drive wherein the first address is either maintained by the first drive bay, when identifying the first drive as the target drive, or is maintained by the second drive bay, when identifying the second drive as the target drive.

2. The storage library of claim 1 wherein the target drive is further identifiable by at least a second address used in conjunction with the first address.

3. The storage library of claim 1 wherein the first address is a storage element address and wherein the target drive is further identifiable via a World Wide Name.

4. The storage library of claim 3 wherein the target drive is further identifiable via a Serial Number associated with the first drive.

5. The storage library of claim 1 wherein the second drive is masked from being identifiable to the host until the second drive is switched to the target drive and the first drive is masked from being identifiable to the host after the second drive is switched to the target drive.

6. The storage library of claim 1 wherein the switching system reassigns the first address from the first drive bay to the second drive bay.

7. The storage library of claim 6 wherein the switching system reassigns the first address from the first drive bay to the second drive bay when the first drive is disabled.

8. The storage library of claim 1 wherein the switching system reassigns the first address without interrupting power to the storage library.

9. The storage library of claim 1 wherein the switching system reassigns the first address from the first drive bay to the second drive bay without the host having any knowledge of the address switch.

10. The storage library of claim 1 wherein the switching system is comprised by a processing device.

11. The storage library of claim 1 wherein the first address is maintained by either the first drive or the second drive.

12. The storage library of claim 1 wherein the first drive is selected from a group consisting of: a disc drive docking station, a disc drive magazine docking station, a solid state storage device docking station, and a drive configured to receive independent storage discs.

13. The storage library of claim 1 wherein the first and the second drives are each tape drives and the plurality of removable storage element are tape cartridges.

14. The storage library of claim 1 wherein at least one of the removable storage elements is selected from a group consisting of: disc drives adapted for mobility from standard disc drives, mobile disc drive magazine, solid state storage devices adapted for mobility, independent storage discs.

15. The storage library of claim 1 wherein the switching system is comprised by the storage library.

16. A storage library comprising:
a first drive identified as a target drive to a host via at least a first address; a second drive that is masked from being identified by the host when the first drive is the target drive; a controller linked with a switch system that is configured to shift the at least first address to the second drive from the first drive wherein after the shift the second drive is identified as the target drive to the host and the first drive is masked from being identified by the host; and a plurality of removable storage element adapted to cooperate with either the first drive or the second drive to perform storage operations;
a first drive bay that accommodates a first drive and a second drive bay that accommodates a second drive;
a first address that is either maintained by the first drive bay, when identifying the first drive as the target drive, or is maintained by the second drive bay, when identifying the second drive as the target drive.

17. The storage library of claim 16 further comprising a means for switching from the target drive from the first drive to the second drive.

18. The storage library of claim 16 further comprising a means for masking a drive from the host.

19. A method for directing storage traffic in a storage library comprising:
indentifying a first drive as a target drive to a host via at least a first address;
reassigning the first address to a second drive so that the second drive is identified as the target drive to the host, wherein the at least a first address is maintained by a drive bay that accommodates one of the drives;
loading one of a plurality of removable storage elements included in the storage library in a cooperating relationship with the target drive; and
receiving storage related communications from the host directed to the target drive.

20. The method of claim 19 wherein the reassigning step is performed after the first drive is disabled.

21. The method of claim 20 further comprising replacing the first drive with a third drive and reassigning the first address to the third drive without altering power to the storage library.

22. The method of claim 19 wherein the host has no knowledge that the target drive changed from the first drive to the second drive.

23. The method of claim 19 wherein the target drive is identified via a storage element address maintained by the library and a Serial Number and World Wide Name associated with the target drive.

24. The method of claim 19 wherein the reassigning step is accomplished by at least one command executed by touching a touch screen associated with the storage library.

\* \* \* \* \*